United States Patent [19]

Matsukawa

[11] Patent Number: 5,309,521
[45] Date of Patent: May 3, 1994

[54] METHOD AND APPARATUS FOR GENERATING A CHARACTER CURVE BY DIVIDING AND DEVELOPING A BÈZIER CURVE

[75] Inventor: Tadahiro Matsukawa, Nagoya, Japan

[73] Assignee: Mitsubhishi Jukogyo Kabushiki Kaisha, Tokyo, Japan

[21] Appl. No.: 717,819

[22] Filed: Jun. 19, 1991

[30] Foreign Application Priority Data

Jun. 28, 1990 [JP] Japan .................. 2-168556

[51] Int. Cl.$^5$ ............ G06K 9/48; G06F 15/72
[52] U.S. Cl. ............................ 382/22; 382/23; 395/142
[58] Field of Search ........ 382/47, 22, 23, 24, 382/25; 395/142, 141, 143; 340/728; G06K 9/48, 9/46, 9/42; G06F 15/72; G09G 1/06

[56] References Cited

U.S. PATENT DOCUMENTS

4,620,287 10/1986 Yam ................. 395/142
5,042,075 8/1991 Sato ................. 382/47

FOREIGN PATENT DOCUMENTS

0349182 3/1990 European Pat. Off. .
0376317 4/1990 European Pat. Off. .

OTHER PUBLICATIONS

Proceedings of the IEEE 1989 Custom Integrated Circuits Conference 15 May 1989, San Diego, CA., USA, Kai et al., 'a high speed outline font rasterizing LSI.

Primary Examiner—Yon J. Conso
Attorney, Agent, or Firm—Wenderoth, Lind & Ponack

[57] ABSTRACT

A control computer, an error calculator, a Bézier curve divider and an output device are provided for generating a character curve. Coordinates of end points and control points of a Bézier curve are input to the control computer. The error calculator determines squares of distances of the input control points from a straight line connecting the end points as errors. If these errors exceed a tolerable range, the curve divider divides the curve into two parts, and new coordinates of new end points and control points of a divided Bézier curve are input to the error calculator. The curve division and error calculation are repeatedly carried out until the calculated errors fall within the tolerable range. The end points of the respective divided curves are connected by straight lines to develop the original curve.

3 Claims, 4 Drawing Sheets

METHOD AND APPARATUS FOR GENERATING A CHARACTER CURVE BY DIVIDING AND DEVELOPING A BéZIER CURVE

BACKGROUND OF THE INVENTION

1. Field of the Invention

The present invention relates to a method and apparatus for forming a character in an Raster Image Processor (RIP) of an electronic printer or the like, and more particularly to a method and apparatus for dividing and developing a Bézier curve representing a character at a high speed.

2. Description of the Prior Art

Conventional processing methods for developing a character curve are based on the following:

(1) A curve is divided and an error calculated in succession by software.

(2) As disclosed in Laid-Open Japanese Patent Specification No. 1-175085 (1989), an outline font is formed using parameters indicating coordinates of a curved section.

However, these conventional methods suffer the following respective drawbacks:

(1) Since it is necessary to successively process a large number of calculations for dividing the curve and calculating the error, a substantial amount of time is expended in the software processing of the character curve.

(2) In the case of indicating coordinates of a curved section with the aid of parameters, a tolerable error cannot be clearly defined.

SUMMARY OF THE INVENTION

It is therefore one object of the present invention to provide a novel method and apparatus for dividing and developing a Bézier curve at a high speed as compared to the prior art.

According to the one feature of the present invention, there is provided a method and apparatus for dividing and developing a Bézier curve using a control computer, an error calculator, a Bézier curve divider and an output device, which are characterized by the processing steps of (a) inputting coordinates of end points and control points of a Bézier curve to the control computer, (b) calculating squares of distances of the input control points from a straight line connecting the end points as errors, (c) dividing the curve into two parts and newly inputting coordinates of end points and curve points of a Bézier curve by employing the dividing point on the Bézier curve and one of the end points used in the processing step (a) respectively as new end points in the event that the error calculated in the processing step (b) exceeds a tolerable range, (d) repeating the processing steps (b) and (c) with respect to the control points and end points of the curve input in the processing steps (c) until the errors calculated in the processing step (b) fall in the tolerable range, and (e) connecting the end points of the respective divided curves to develop an original character curve, the calculation and evaluation of the errors in the processing step (b) being carried out with respect to the respective control points.

According to the present invention, due to the abovefeatured processing steps of the present method and apparatus, calculation of errors and division of a curve can be carried out at a high speed, and the overall developing speed of a curve is enhanced.

The above-mentioned and other objects, features and advantages of the present invention will become more apparent by reference to the following description of one preferred embodiment of the invention taken in conjunction with the accompanying drawings.

DETAILED DESCRIPTION OF THE PREFERRED EMBODIMENT

Figure 1:
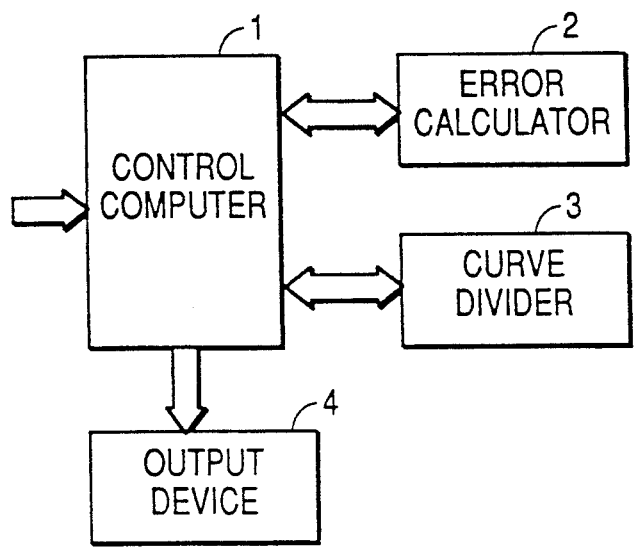
FIG. 1 is a block diagram showing a system configuration of a curve development apparatus according to the present invention.
Figure 6:
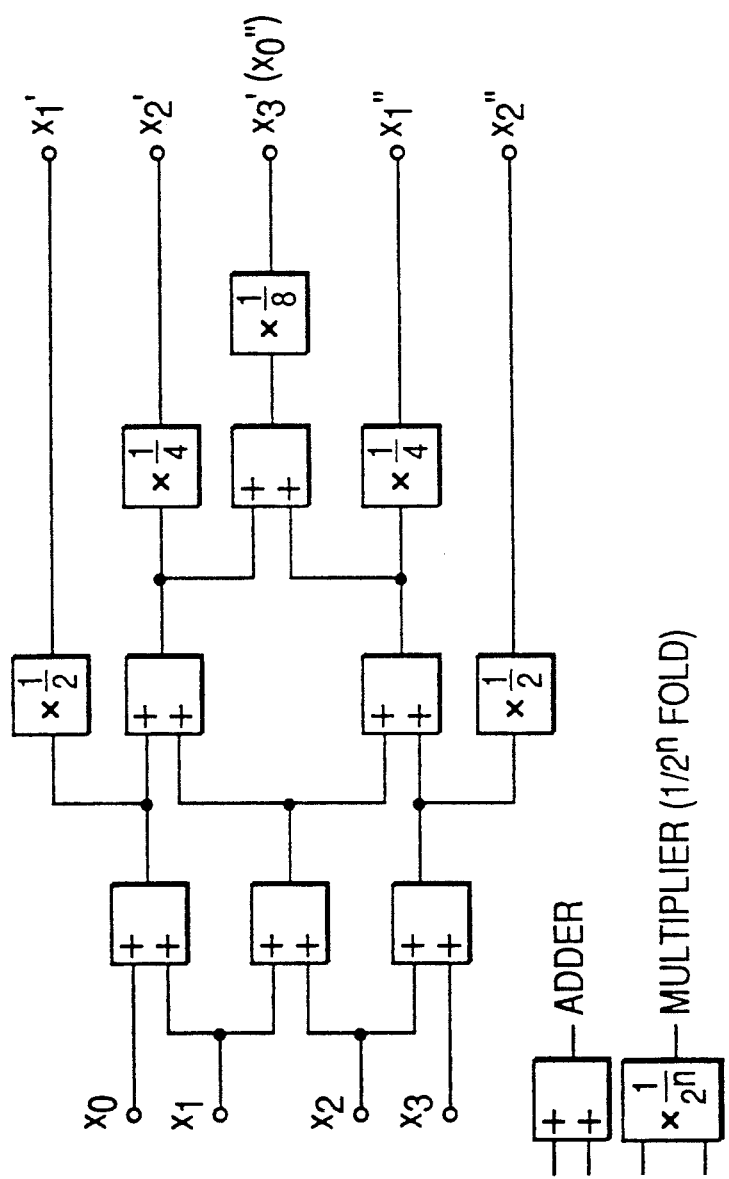
FIG. 6 is a block diagram showing a hardware configuration of a Bézier curve divider included in the curve developing system shown in FIG. 1.

A system configuration of a curve developing apparatus according to the present invention is illustrated in FIG. 1. Reference numeral 1 designates a control computer, that is, a computer for control purposes, which controls a processing flow of arithmetic operations. Reference numeral 2 designates an error calculator having a detailed hardware configuration as shown in FIG. 3, reference numeral 3 designates a curve divider having a detailed hardware construction as shown in FIG. 6, and reference numeral 4 designates an output device such as a display monitor, a printer or an image memory.

As additional characteristic features of the present invention, the following points are to be noted:

(1) A dedicated error calculator 2 for parallel processing as shown in FIG. 1 is employed.

Figure 2:
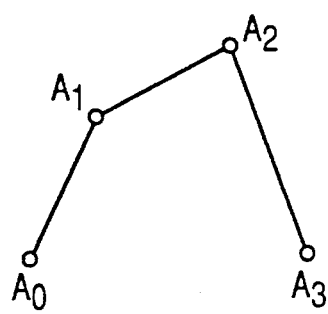
FIG. 2(1), 2(2) and 2(3) are schematic views for explaining the process of forming a Bézier curve according to the present invention.
Figure 2:
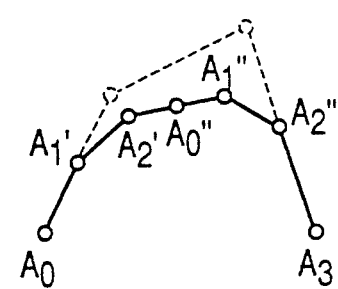
Figure 2:
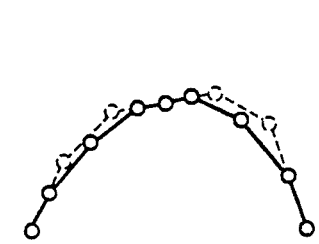
Figure 3:
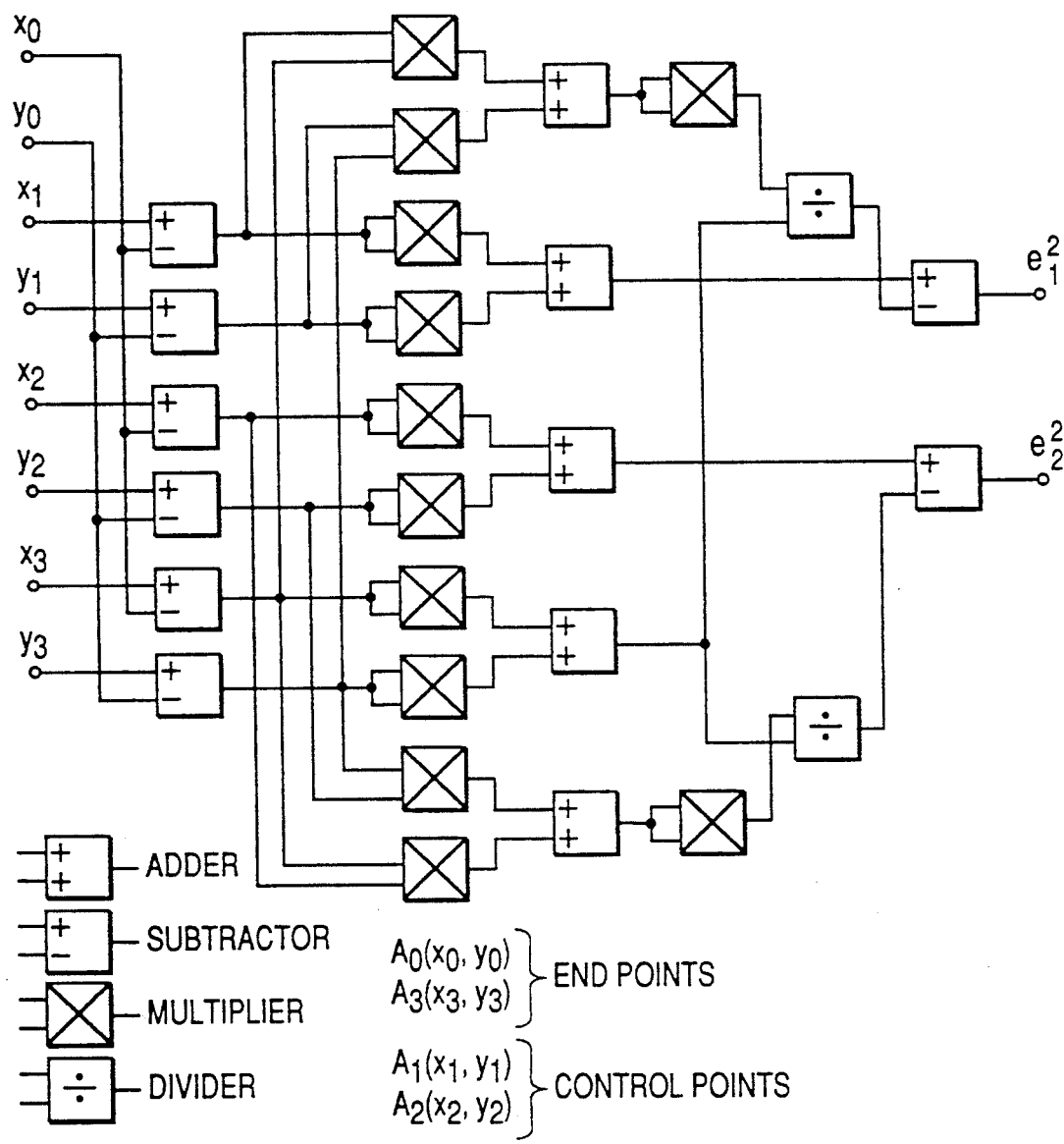
FIG. 3 is a block diagram showing a hardware configuration of an error calculator included in the curve developing system shown in FIG. 1.

(2) Referring also to FIG. 2, in the error calculator shown in FIG. 3, $x_i$, $y_i$ ($i=0, 1, 2, 3$) are x- and y-coordinates of end points $A_0$ and $A_3$ and control points $A_1$ and $A_2$, which serve as input values for the calculator. Also, errors $e_1^2$ and $e_2^2$ are defined as squares of distances of the control points of the input curve from a straight line connecting the end points, and these errors are given as outputs of the calculator shown in FIG. 3.

(3) Referring also to FIG. 2, in the curve divider shown in FIG. 6, $x_i$ ($i=0, 1, 2, 3$) are x-coordinates of the end points $A_0$ and $A_3$ and the control points $A_1$ and $A_2$, while $x_i'$, $x_i''$ ($i=0, 1, 2, 3$) are x-coordinates of newly produced end points and control points as described below. With respect to the y-coordinates, a corresponding calculation is carried out in a similar manner.

The error calculator shown in FIG. 3 is provided for the purpose of calculating errors which serve as an index for completing the division processing. As the error, a square of a distance of the control point from a straight line connecting the end points is used.

Figure 5:
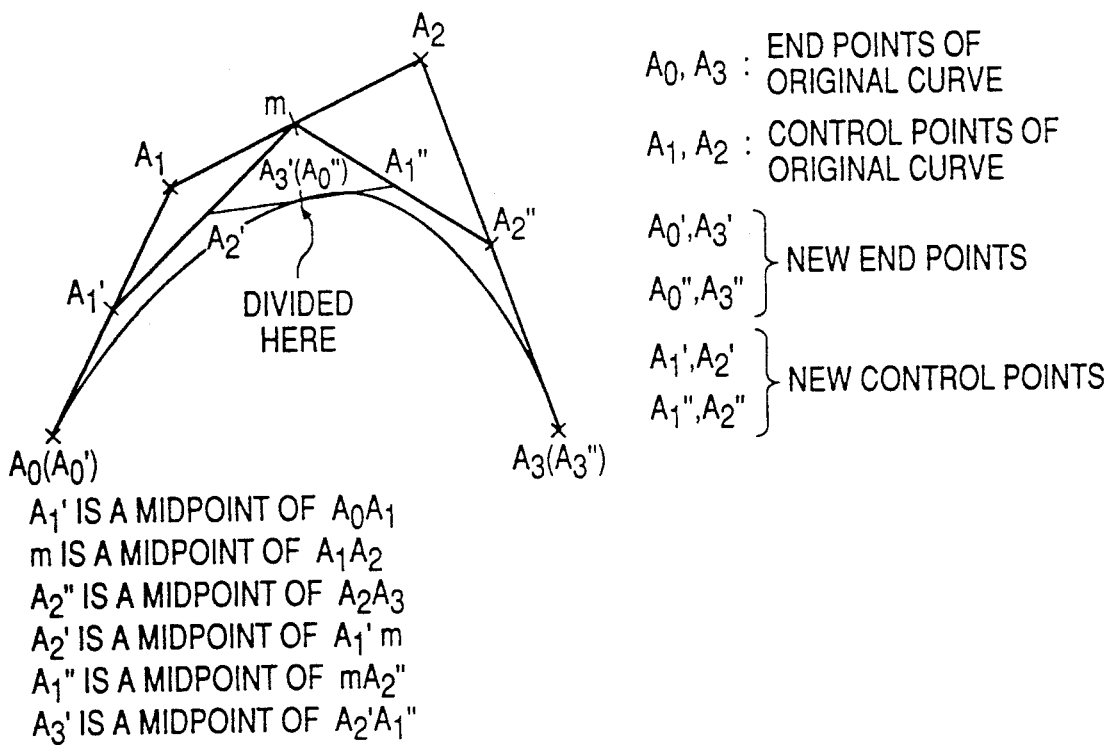
FIG. 5 is a diagram for describing the mode of dividing a Bézier curve according to the present invention.

An apparatus including adders and multipliers as shown in FIG. 6 is provided for the purpose of outputting new end points and new control points in the case of dividing a Bézier curve into two parts. The Bézier curve is divided into two parts as shown in FIG. 5. The dividing point and one of the original end points are employed as new end points, and coordinates of these new end points and new control points are sent to the control computer as shown in FIG. 6.

A processing flow of developing a character curve is explained below.

First, as shown in FIG. 2(1), coordinates of the control points $A_1$ and $A_2$ and the end points $A_0$ and $A_3$ are preset, and these coordinates are input to the control computer 1. The control computer 1 sends these coordinates to the error calculator 2. Immediately, the errors defined as squares of the distances of the control points $A_1$ and $A_2$ from a straight line connecting the end points $A_0$ and $A_3$ are calculated, and the calculated error values are sent back to the control computer 1. The control computer 1 determines whether the error values fall within a tolerable range. If the error values fall within the tolerable range, the straight line connecting the end points is sent to the output device 4. However, if the error values fall outside the tolerable range, the coordinates of the control points and the end points are sent to the divider 3 to obtain new end points and new control points. As shown in FIG. 2(2), the control computer 1 repeats similar operations for the respective divided curves until errors within the tolerable range are obtained, and a curve shown in FIG. 2(3) is developed as a completed curve represented by plural connected straight lines.

It is noted that the calculation of errors in the error calculator 3 (FIG. 3) is carried out in the following manner:

$$e_1^2 = |X_1 - X_0|^2 - \frac{\{(X_1 - X_0) \cdot (X_3 - X_0)\}^2}{|X_3 - X_0|^2}$$

$$e_2^2 = |X_2 - X_0|^2 - \frac{\{(X_2 - X_0) \cdot (X_3 - X_0)\}^2}{|X_3 - X_0|^2}$$

Figure 4:
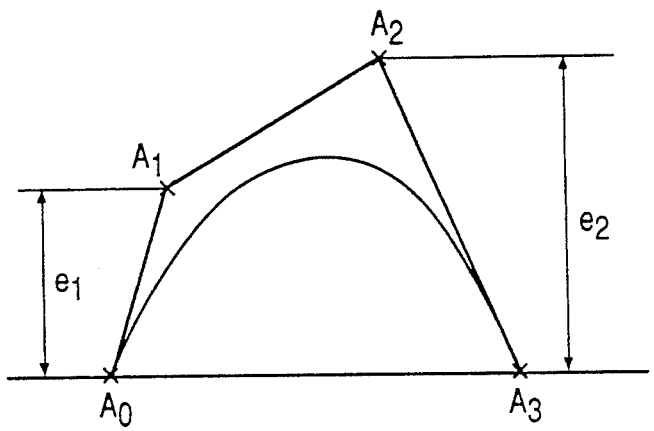
FIG. 4 is a diagram for describing a Bézier curve and errors to be employed according to the present invention.

$X_0$ ($x_0$, $y_0$), $X_3$ ($x_3$, $y_3$): coordinate vectors of end points $A_0$ and $A_3$ $X_1$ ($x_1$, $y_1$), $X_2$ ($x_2$, $y_2$): coordinate vector of control points $A_1$ and $A_2$ $e_1$, $e_2$: errors (See FIG. 4)

$|x_i|$: magnitude (or absolute value) of $X_i$ $X_i \cdot X_j$: scaler product of $X_i$ by $X_j$ As will be apparent from the detailed description of the preferred embodiment set forth above, according to the present invention, a method and apparatus for dividing and developing a Bézier curve makes use of a control computer, an error calculator, a Bézier curve divider and an output device, and includes the processing steps of (a) inputting coordinates of end points and control points of a Bézier curve to the control computer, (b) calculating squares of distances of the input control points from a straight line connecting the end points as errors, (c) dividing the curve into two parts and newly inputting coordinates of end points and control points of a Bézier curve by employing the dividing point on the Bézier curve and one of the end points used in the processing step (a) respectively as new end points in the event that the error calculated in the processing step (b) exceeds a tolerable range, (d) repeating the above-mentioned steps (b) and (c) with respect to the control points and end points of the curve input in the aforementioned processing step (c) until the errors calculated in the above-mentioned processing step (b) fall within the tolerable range, and (e) connecting the end points of the respective divided curves to develop an original character curve, the calculation and evaluation of the errors in the above-mentioned processing step (b) being carried out with respect to the respective control points.

According to the invention, the calculation of errors and divisions of the curve are processed more rapidly, and the character curve developing speed is enhanced.

While a principle of the present invention has been described above in connection with one preferred embodiment of the invention, it is intended that all matter contained in the above description and illustrated in the accompanying drawings be interpreted as illustrative and not as limitative of the scope of the invention.

What is claimed is:

1. An image processing method for a raster image processor in which character data indicative of display coordinates of a character curve is generated based on input data indicative of coordinates of a preset Bézier curve, said method comprising:

a first step of inputting the input data indicative of the coordinates of the preset Bézier curve into a control computer of the raster image processor, the coordinates of the input data including first and second end points of the preset Bézier curve and first and second control points defining the Bézier curve which are intermediate the first and second end points;

a second step of applying the input data from the control computer to an error calculator circuit which is configured to generate error data denoting respective distances from said first control point and said second control point to a straight line connecting said first and second end points of the preset Bézier curve;

a third step of inputting the error data generating by said error calculator circuit to said control computer and determining whether the respective distances from said first control point and said second control point to said straight line connecting said first and second end points of the preset Bézier curve fall within a preset tolerable range;

a fourth step of applying character data denoting the straight line connecting said first and second end points of the present Bézier curve from the control computer to an output display device when the respective distances denoted by the error data fall within the tolerable range;

a fifth step of applying the input data from the control computer to a curve divider circuit when the respective distances denoted by the error data fall outside the tolerable range, the curve divider circuit configured to generate divided curve data denoting coordinates of a first curve segment forming a Bézier curve having as end points said first end point and a common dividing point and having two intermediate control points defining the first curve segment and a second curve segment forming a Bézier curve having as end points said common dividing point and said second end point and having two intermediate control points defining the second curve segment;

a sixth step of repeatedly carrying out in succession said second through fifth steps with respect to each curve segment denoted by the divided curve data generated by said curve divider circuit until the respective distances denoted by error data corresponding to each curve segment fall within the tolerable range.

2. An image processing apparatus comprising:

a raster image processor in which character data indicative of display coordinates of a character curve is generated based on input data indicative of coordinates of a preset Bézier curve, the coordinates of the input data including first and second end points of the preset Bézier curve and first and second control points defining the Bézier curve which are intermediate the first and second end points; and, an output device, coupled to said raster image processor, for receiving the character data generated by said raster image processor;

said raster image processor comprising, (a) a first dedicated circuit having plural inputs for receiving respective input data denoting coordinates of a first input curve defined by two end points and two control points intermediate the two end points and having a hardware configuration which generates error data denoting respective distances from said two control points to a straight line connecting said two end points of the first input curve, (b) a second dedicated circuit having plural inputs for receiving respective input data denoting coordinates of a second input curve defined by two end points and two control points intermediate the two end points and having a hardware configuration which generates divided curve data denoting coordinates of a first curve segment forming a Bézier curve having as end points one of said two end points of said second input curve and a common dividing point and having intermediate two control points defining the first curve segment and a second curve segment forming a Bézier curve having as end points said common dividing point and the other of said two end points and having two intermediate control points defining the second curve segment, and, (c) a control computer means, coupled to the output device and to the first and second dedicated circuits, for effecting a first processing of receiving the input data indicative of the coordinates of the preset Bézier curve, a second processing of applying the input data as the first input curve to the first dedicated circuit to obtain error data from said first dedicated circuit with respect to said preset Bézier curve, a third processing of determining based on the error data whether the respective distances from said first control point and said second control point to a straight line connecting said first and second end points of the preset Bézier curve fall within a preset tolerable range, a fourth processing of applying character data denoting the straight line to the output device when the respective distances denoted by the error data fall within the tolerable range, a fifth processing of applying the input data as the second input curve to the second dedicated circuit when the respective distances denoted by the error data fall outside the tolerable range to obtain divided curve data denoting coordinates of a first curve segment forming a Bézier curve having as end points said first end point and a common dividing point and having two intermediate control points defining the first curve segment and a second curve segment forming a Bézier curve having as end points said common dividing point and said second end point and having two intermediate control points defining the second curve segment, and a sixth processing of repeatedly carrying out in succession said second through fifth processings with respect to each curve segment denoted by the divided curve data generated by said second dedicated circuit until the respective distances denoted by error data corresponding to each curve segment fall within the tolerable range.

3. An image processing apparatus as recited in claim 2, wherein the output device includes at least one of a display monitor, a printer and a memory.

* * * * *